(12) United States Patent
Morales

(10) Patent No.: US 11,366,620 B1
(45) Date of Patent: Jun. 21, 2022

(54) COLOR CALIBRATION MANAGEMENT SYSTEM FOR PRINTING DEVICES

(71) Applicant: Kyocera Document Solutions Inc., Osaka (JP)

(72) Inventor: Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 24 days.

(21) Appl. No.: 17/122,370

(22) Filed: Dec. 15, 2020

(51) Int. Cl.
*G06K 15/02* (2006.01)
*G06F 3/12* (2006.01)
*G03G 15/01* (2006.01)

(52) U.S. Cl.
CPC .......... *G06F 3/1208* (2013.01); *G06F 3/1259* (2013.01); *G06F 3/1291* (2013.01); *G03G 15/01* (2013.01); *G03G 2215/0158* (2013.01)

(58) Field of Classification Search
CPC .... G06F 3/1208; G06F 3/1259; G06F 3/1291; G03G 15/01; G03G 2215/0158; G06K 15/1878; G06K 15/027; H04N 1/6033
See application file for complete search history.

(56) References Cited

U.S. PATENT DOCUMENTS

| 7,271,935 | B2 | 9/2007 | Coons et al. | |
|---|---|---|---|---|
| 8,014,024 | B2 | 9/2011 | Viturro et al. | |
| 2006/0197966 | A1* | 9/2006 | Viturro | H04N 1/6055 358/1.9 |
| 2006/0215239 | A1 | 9/2006 | Iannazzi | |
| 2013/0107290 | A1* | 5/2013 | Lin | H04N 1/6033 358/1.9 |
| 2014/0285856 | A1* | 9/2014 | Wen | H04N 1/6097 358/474 |

* cited by examiner

*Primary Examiner* — Iriana Cruz
(74) *Attorney, Agent, or Firm* — Millen, White, Zelano & Branigan, P.C.; William Nixon

(57) ABSTRACT

A color management system for a printing system includes a fleet color management service that manages color calibration for printing devices. Calibration target print jobs are sent to the printing devices within a group. The calibration target print jobs are measured to capture color printing data. The measured data is uploaded to the fleet color management service, which determines color printing parameters for the group, including an aggregate maximum end point target. The fleet color management service generates a tone reproduction curve for all of the printing devices based on the color printing parameters. Validation of the color printing capabilities are performed using a validation set of the printing devices to determine the validation set printing devices can meet the aggregate maximum end point target.

20 Claims, 9 Drawing Sheets

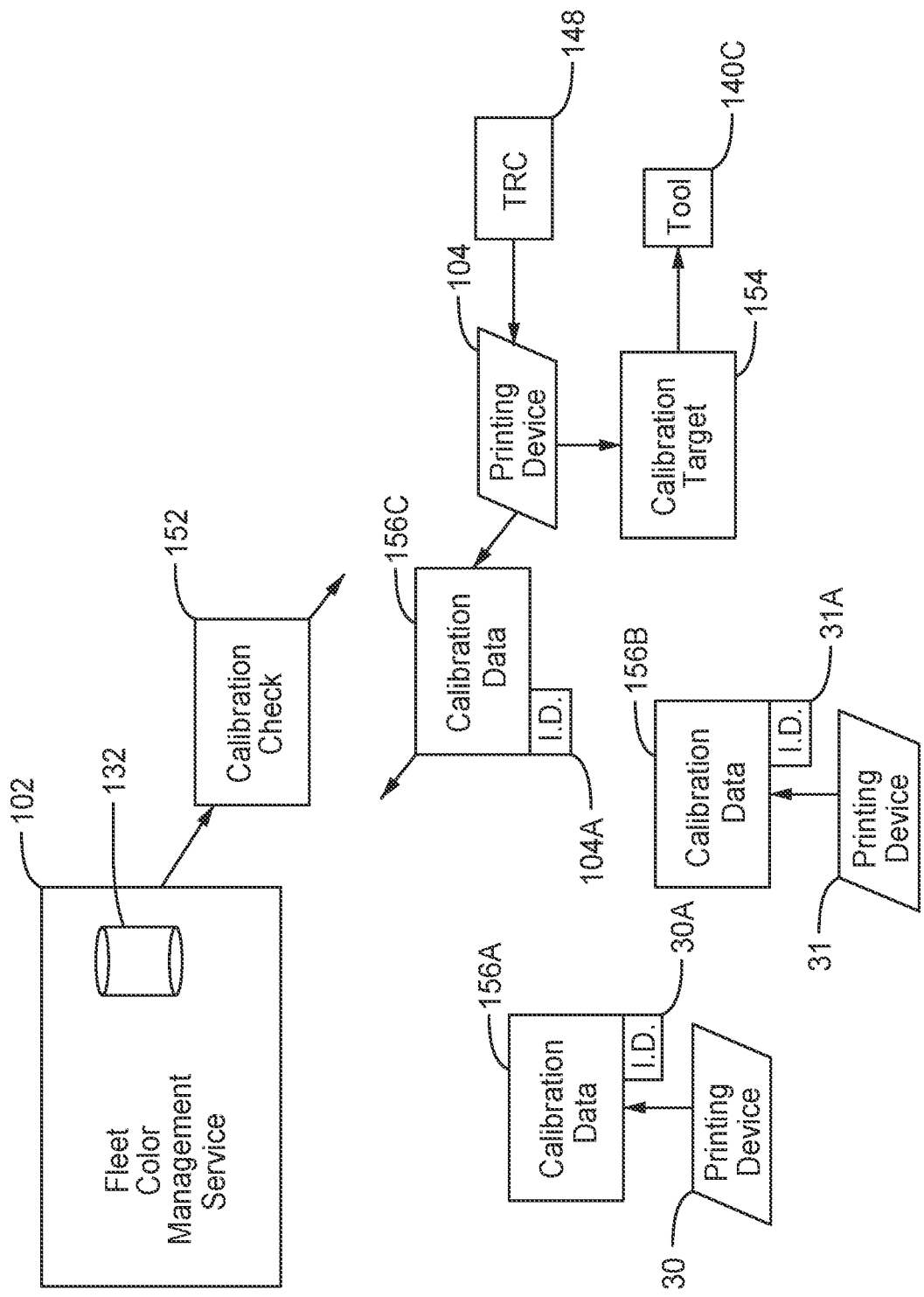

FIG. 4

| Color | Aim | Min. | Max. | Tone Value Inc. |
|---|---|---|---|---|
| Cyan | 1.40 | 1.35 | 1.45 | 17 ± 3 |
| Magenta | 1.40 | 1.38 | 1.45 | 17 ± 3 |
| Yellow | 0.90 | 0.90 | 0.98 | 17 ± 3 |
| Black | 1.60 | 1.55 | 1.65 | 17 ± 3 |

Density at solid color <1>

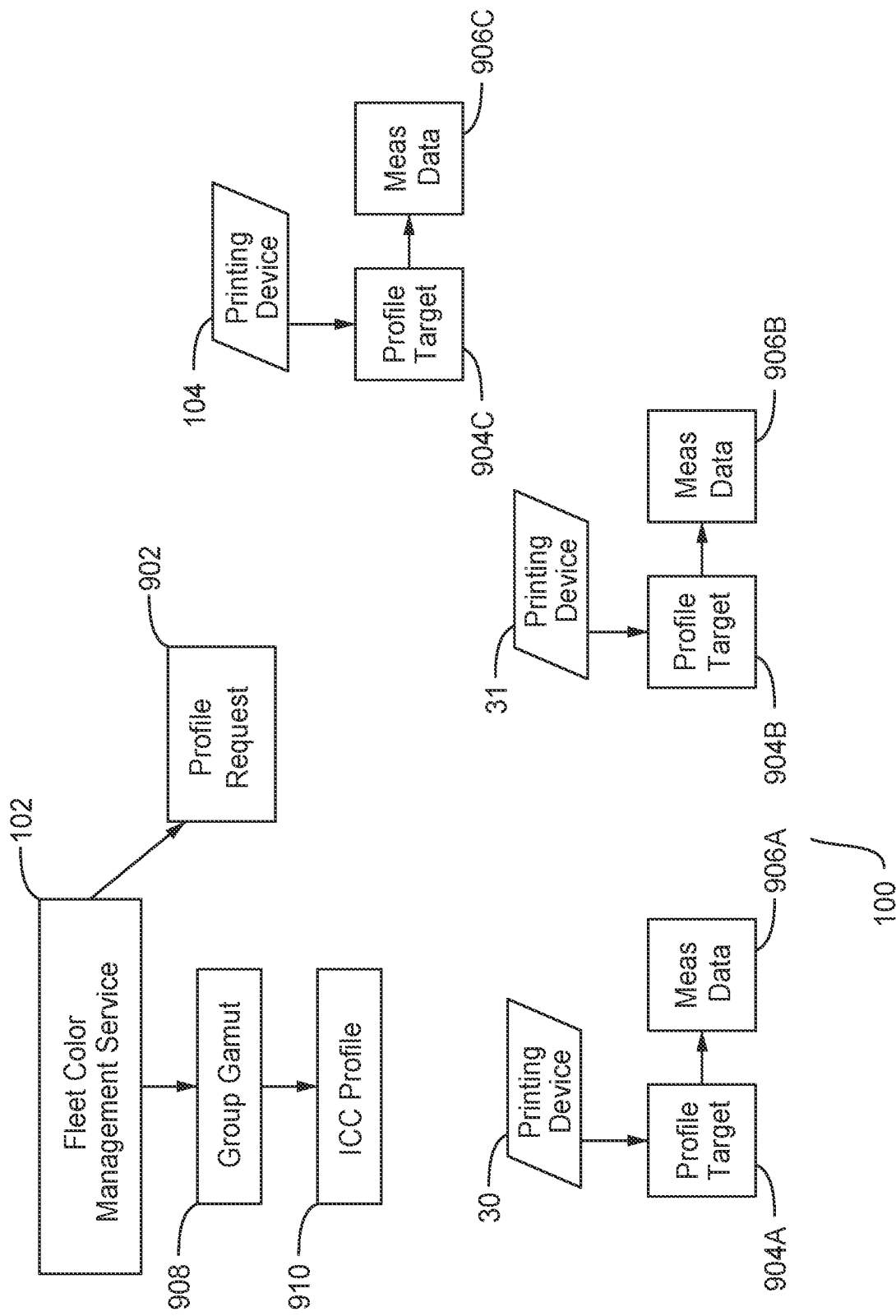

COLOR CALIBRATION MANAGEMENT SYSTEM FOR PRINTING DEVICES

FIELD OF THE INVENTION

The present invention relates to managing color calibration in a printing system having a plurality of printing devices using end point targets

DESCRIPTION OF THE RELATED ART

Calibration of a fleet of printing devices usually is performed by designating one of the printing devices as the master printing device. The other printing devices are designated as secondary printing devices. The calibration is performed on the master printing device. End point target minimum and maximum values as well as aims are established for this printing device. The information is transferred to the other printing devices in the fleet. The assumption is that the minimum and maximum end point target values can be achieved by all printing devices in the fleet. This fact may not necessarily be true. A similar problem exists for International Color Consortium (ICC) profiles used for multiple printing devices in a fleet. For identical printing devices, an ICC profile is created using the master printing device. This profile then is shared between all identical printing devices. For fleets with heterogeneous printing devices, an ICC profile is established for each type of printing device. As with calibration, the use of a master ICC profile is predicated on the assumption that all printing devices in the fleet can achieve the same gamut.

SUMMARY OF THE INVENTION

A method for managing color calibration in a plurality of printing devices is disclosed. The method includes generating a plurality of calibration target print jobs in response to a calibration request for the plurality of printing devices. The method also includes printing the plurality of calibration target print jobs at the plurality of printing devices. Each of the plurality of calibration target print jobs is assigned a unique identifier and sent to a specific printing device of the plurality of printing devices associated with the unique identifier. The method also includes measuring each of the plurality of calibration target print jobs. The method also includes uploading measurement data for each of the plurality of calibration target print jobs using the respective unique identifier to a platform. The method also includes aggregating the measurement data from the plurality of calibration target print jobs. The method also includes determining an aggregate maximum end point targets applicable to the plurality of printing devices bases on the measurement data. Each of the plurality of printing devices can achieve the aggregate maximum end point target. The method also includes establishing an aim for the plurality of printing devices using the aggregate maximum end point target. The method also includes creating a tone reproduction curve for at least one printing device according to the aim plus the aggregate maximum end point target.

A method for performing a calibration check for a plurality of printing devices is disclosed. The method includes generating a calibration check target based on a tone reproduction curve applicable to the plurality of printing devices. The calibration check target corresponds to a maximum end point target for each of the plurality of printing devices. The method also includes selecting a validation set of printing devices from the plurality of printing devices. The method also includes sending a print job for the calibration check target to each of the validation set of printing devices. The method also includes measuring density values of the print job at each of the printing devices in the validation set. The method also includes determining whether the density values meet the maximum end point target for each of the printing devices in the validation set. The method also includes validating each printing device according to the determination whether the respective density values meet the maximum end point target.

A method for managing color printing for a plurality of printing devices is disclosed. The method includes generating a plurality of calibration target print jobs in response to a calibration request for the plurality of printing devices. The method also includes printing the plurality of calibration target print jobs at the plurality of printing devices. Each of the plurality of calibration target print jobs is assigned a unique identifier and sent a specific printing device of the plurality of printing devices associated with the unique identifier. The method also includes measuring each of the plurality of calibration target print jobs. The method also includes uploading measurement data for each of the plurality of calibration target print jobs using the respective unique identifier to a platform. The method also includes aggregating the measurement data from the plurality of calibration target print jobs. The method also includes determining an aggregate maximum end point target applicable to the plurality of printing devices based on the measurement data. Each of the plurality of printing devices can achieve the aggregate maximum end point target. The method also includes establishing an aim for the plurality of printing devices using the aggregate maximum end point target. The method also includes creating a tone reproduction curve for at least one printing device according to the aim plus the aggregate maximum end point target. The method also includes generating a calibration check target based on the tone reproduction curve applicable to the plurality of printing devices. The calibration check target corresponds to the aggregate maximum end point target for each of the plurality of printing devices. The method also includes selecting a validation set of printing devices from the plurality of printing devices. The method also includes sending a print job for the calibration check target to each of the printing devices in the validation set. The method also includes printing the print job for the calibration check target at each of the printing devices in the validation set. The method also includes measuring density values of the print job at each of the printing devices in the validation set. The method also includes determining whether the density values for each of the printing devices in the validation set meet the aggregate maximum end point target. The method also includes validating each of the printing devices in the validation set according to the determination whether the respective density values meet the aggregate maximum end point target.

BRIEF DESCRIPTION OF THE DRAWINGS

Various other features and attendant advantages of the present invention will be more fully appreciated when considered in conjunction with the accompanying drawings.

FIG. 1C illustrates a block diagram of the data flow for printing device group calibration check using the fleet color management service according to the disclosed embodiments.

FIG. 4 illustrates a table of aim values and maximum and minimum EPT values for a plurality of colors according to the disclosed embodiments.

FIG. 7 illustrates a system configured for creating and validating a group ICC profile according to the disclosed embodiments.

DETAILED DESCRIPTION OF THE PREFERRED EMBODIMENTS

Figure 1A:
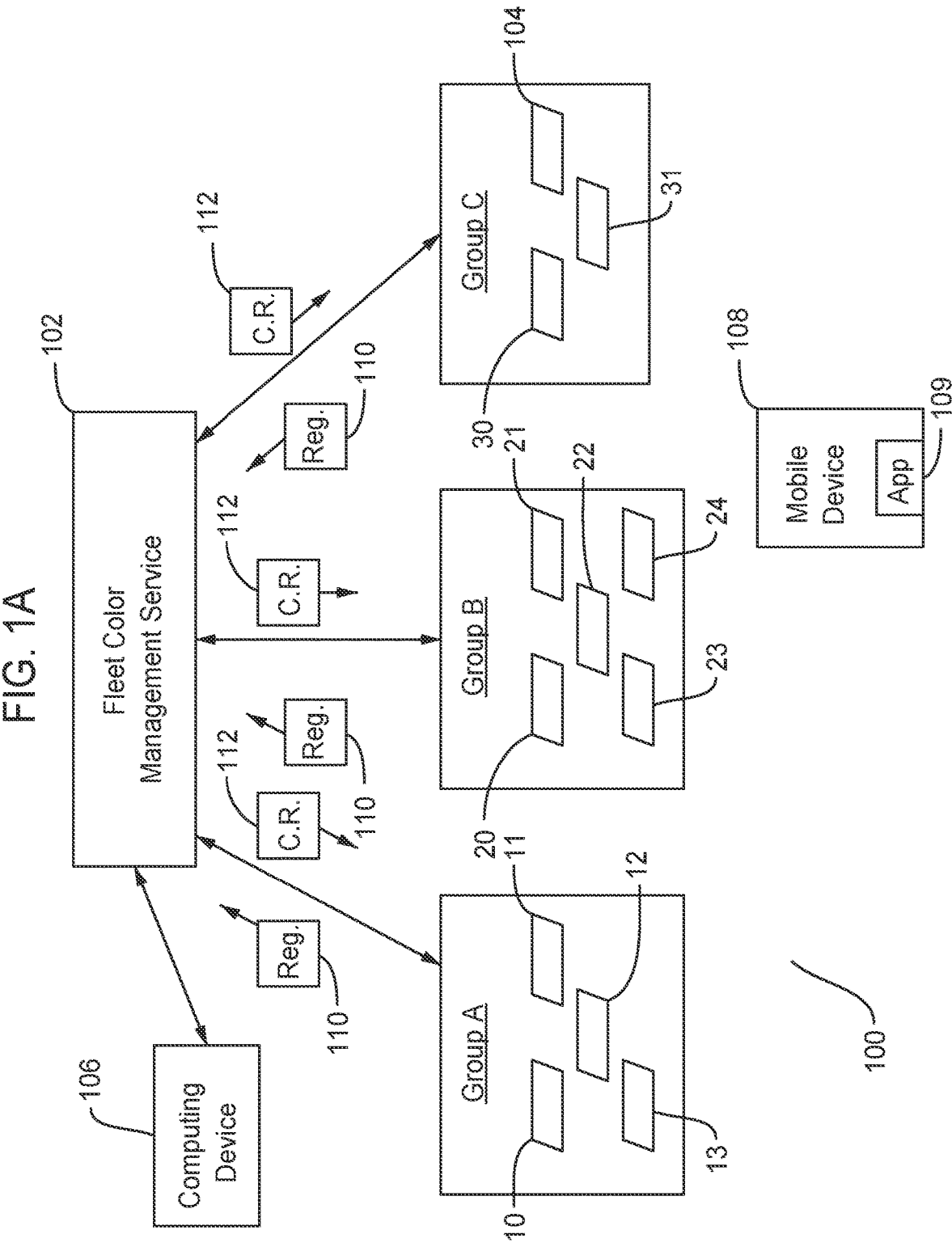
FIG. 1A illustrates a printing system having a fleet color management service according to the disclosed embodiments.

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments enhance fleet color management so that tone reproduction curves (TRCs) and ICC profiles are based on aggregate fleet information as opposed to a master printing device. The operator would register two or more printing devices within the fleet color management system. The operator may organize the printing devices into one or printing device groups. Per typical color management, the operator will need to calibrate and then profile the printing devices in the fleet.

Using printing device groups, printing group calibration occurs using calibration data to establish the minimum and maximum end point targets (EPTs) for the specific printing devices. After all the calibration data is uploaded, the system aggregates the data from all the printing devices to establish aggregate minimum and maximum EPTs using the largest minimum value and the smallest maximum value. These are the values that all printing devices can reproduce. The disclosed embodiments establish a group aim using the group minimum and maximum EPTs. The system creates a TRC for each printing device using the group minimum and maximum EPTs and the fleet aim. The TRCs are installed in the printing devices in the group.

The disclosed embodiments also perform printing device group calibration checks. Calibrations must be validated in a recurring basis. The system prints a calibration check target. The target is used to determine whether the minimum and maximum EPTs for the specific printing device are valid. The system may check group calibration in a number of ways. Because the system stores minimum and maximum EPTs for each of the printing devices, the disclosed embodiments may ascertain whether the printing device can reproduce the maximum EPT for the printing device group. In some embodiments, the minimum EPT also may be considered.

The disclosed embodiments also provide for printing device group ICC profile creation. The printing group ICC profile operates in the same manner as calibration except for the following differences. The system prints an ICC profile creation range as opposed to a calibration target. The system also establishes the gamut, or complete range, for each of the printing devices in the group. The system also establishes a group gamut that represents the gamut all printing devices can produce. The system creates and installs ICC profiles for each printing device. Printing device group ICC profile validation may be performed.

FIG. 1A depicts a printing system 100 having fleet color management according the disclosed embodiments. Printing system 100 includes a plurality of printing devices, arranged in groups A, B, and C. Additional groups may be included in system 100. An example of a printing device 104 is disclosed by FIG. 2 below. The printing devices may print, scan, copy, send and receive documents, exchange data, and the like within system 100.

System 100 also includes fleet color management service 102. Fleet color management service 102 may be a server connected to the printing devices within system 100. In some embodiments, fleet color management service 102 may be a cloud-based server that performs the functions to initiate and perform printing device group calibration checks. Alternatively, fleet color management service 102 may be a server on the premise or the location of the printing devices within printing system 100. Fleet color management service 102 may store data received from the printing devices in system 100. It also may perform the processes disclosed below to manage color capabilities and operations within system 100. Service 102 also may send instructions to the printing devices within groups A, B, and C.

Computing device 106 may serve to send instructions or updates to fleet color management service 102. An operator may send requests to perform calibration checks to fleet color management service 102. Fleet color management service 102 then instructs the printing device within system 100 according. The operator may register two or more printing devices within system 100 with fleet color management service 102. The operator then may organize the printing devices into one or more groups. The printing devices in the printing device group may be of the same or different types.

Printing system 100 organizes its printing devices into at least two groups. The relationship between the printing devices in the group may be any criteria. Example criteria may be model/make type, printing capabilities, location, and the like. As shown in FIG. 1A, group A includes printing devices 10, 11, 12, and 13. Each device may have its own serial number or other unique identifier so that data may be sent to that specific printing device within system 100. Group B includes printing devices 20, 21, 22, 23, and 24. Group C includes printing devices 30, 31, and 104. Printing device 104 is disclosed in greater detail below as an example printing device according to the disclosed embodiments. Each group may include many more printing devices as opposed to those shown in FIG. 1A.

Calibration and checks may occur as a group for the printing devices. Fleet color management service 102 may communicate to the printing devices as a group. Thus, fleet color management service 102 may send and receive data from group A for printing devices 10-13. This feature allows fleet color management service 102 to provide specific instructions to the groups and track data for the groups to better manage color printing operations within system 100.

Each printing device within system 100 registers with fleet color management service 102. Thus, registrations 110 are sent to fleet color management service 102 from each printing device. After being registered, the operator or service 102 may organize the printing devices into the applicable groups. After creation of the groups, fleet color management service 102 may send calibration requests 112 to each group. A calibration request 112 is specific to that group such that the printing devices in the group perform the specific calibration request. For example, fleet color management service 102 may send a calibration request 112 to group A including one type of calibration target. After receiving the results of the calibration process, service 102 may send another calibration request to group B with a different type of calibration target. All results from calibration operations are stored for the groups.

System 100 also includes mobile, or computing, device 108. The operator may use mobile device 108 to receive information and notifications from fleet color management service 102. Application 109 may execute on mobile device 108 to enable the operator to manage the printing devices within the groups or each printing device individually. The operators also may send instructions and requests to other components within system 100 using application 109 and mobile device 108. For example, the operator may use application 109 to prepare a calibration request for group C and send it to fleet color management service 102.

Figure 1B:
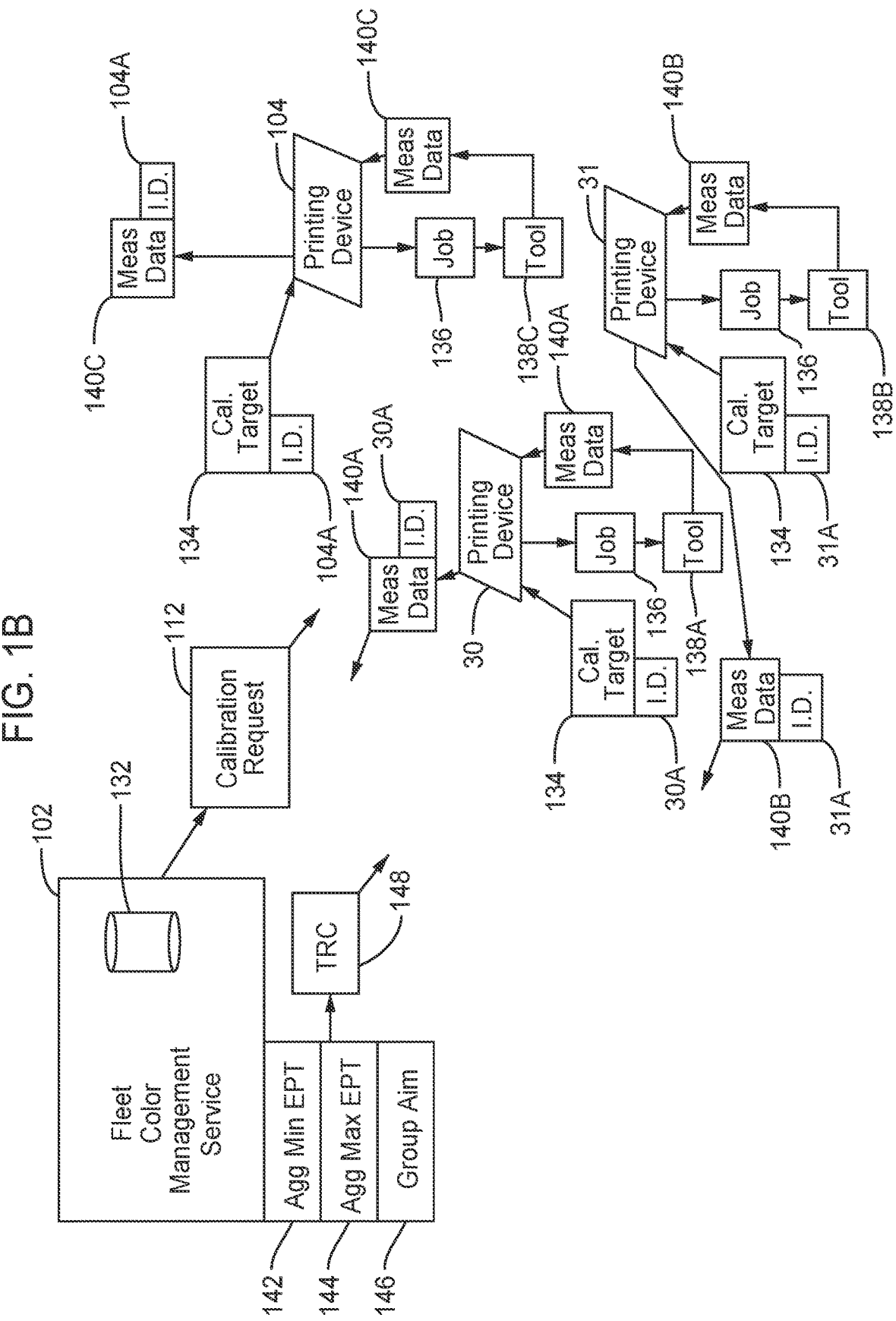
FIG. 1B illustrates a block diagram of the data flow for printing device group calibration using the fleet color management service according to the disclosed embodiments.

FIG. 1B depicts a block diagram of the data flow for printing device group calibration using fleet color management service 102 according to the disclosed embodiments. As disclosed above, the groups and printing devices in system 100 provide calibration data to fleet color management service 102 to profile the printing devices within the fleet. Calibration occurs by group. FIG. 1B shows calibration being performed for group C, which includes printing devices 30, 31, and 104. Fleet color management service 102 may initiate similar calibration operations for groups A and B. Each group will have its own measurement data and other parameter disclosed below that are used to manage color printing within that group.

Fleet color management service 102 creates a group calibration request 112 for group C. Group calibration request 112 includes calibration targets 134 that are provided to each printing device. Calibration targets 134 include target print jobs that are printed out and used at each printing device. The data within the target print jobs may be the same for each device. This data may include color patches that are scanned to capture measurement data for that printing device that is then uploaded to fleet color management service 102.

Calibration targets 134 may include unique identifications to track the calibration print jobs in the individual printing devices. For example, calibration target 134 having identification 30A may be received at printing device 30. Calibration target 134 having identification 31A may be received at printing device 31. Calibration target 134 having identification 140A may be received at printing device 104. Fleet color management service 102 may store the associated identifications for the printing devices along with the associated calibration targets in database 132. In some embodiments, database 132 is within service 102. Alternatively, database 132 may be a separate component within system 100.

Each printing device receiving calibration target 134 prints calibration target print job 136. Print jobs 136 include the information needed to measure calibration target 134. The operator may measure the calibration targets within print jobs 136 in any order. In some embodiments, each printing device may have its own color measurement tool to scan the print jobs and measure the color data from therein. Thus, for example, printing device 30 may include tool 138A, printing device 31 may include tool 138B, and printing device 104 may include tool 138C. Preferably, color measurement tools 138A, 138B, and 138C may be devices that scan the color targets on print job 136. A target may be printed and measured without human intervention if the tool is part of the printing device. Alternatively, the tool may be a handheld device.

Color measurement data are generated by the captured data and tracked within system 100. For example, printing device 30 generates measurement data 140A from its print job 136. Printing device 31 generates measurement data 140B from its print job 136. Printing device 104 generates measurement data 140C from its print job 136. Thus, the measurement data between the printing devices is not the same. Some variance in the captured measurement data is to be expected.

The measured data then is provided to fleet color management service 102. To track the received measurement data, the disclosed embodiments may include the identification provided to the printing device with its calibration target with the uploaded data. For example, printing device 30 provides measured data 140A with identification 30A to fleet color management service 102. Printing device 31 provides measured data 140B with identification 31A. Printing device 104 provides measured data 140C with identification 104A. Using the unique identification for each calibration request for each printing device, fleet color management service 102 may track and store the received measured data with the associated calibration target for the respective printing device.

Fleet color management service 102 using the uploaded measurement, or calibration, data to determine end point targets for each printing device. In some embodiments, EPTs are determined for each color measured using calibration target 134. The end point targets, or EPTs, of each printing device may be the minimum and the maximum EPTs. Minimum and maximum EPTs are disclosed in greater detail below by FIG. 3. Once all the measurement data is processed, the disclosed embodiments aggregate the data from all the printing device within the group. The disclosed embodiments establish aggregate minimum EPT 142 and maximum EPT 144 using the largest minimum EPT value within the group and the smallest maximum EPT value within the group. These are the values that all printing devices within the group can reproduce.

For example, printing device 30 has a minimum EPT value of MN1 and a maximum EPT value of MX1. Printing device 31 has a minimum EPT value of MN2 and a maximum EPT value of MX2. Printing device 104 has a minimum EPT value of MN3 and a maximum EPT value of MX3. Fleet color management service 102 processes the measurement data uploaded to determine these values. It also aggregates these values to determine aggregate minimum EPT 142 and aggregate maximum EPT 144. For example, MN1>MN3>MN2. Thus, aggregate minimum EPT 142 may be MN1. Further, MX3>MX1>MX2. Thus, aggregate maximum EPT 144 may be MX2. Within group C, aggregate minimum EPT 142 has a value of MN1 that relates to printing device 30 while aggregate maximum EPT

144 has a value of MX2 that relates to printing device 31. The minimum aggregate value is always reproducible but the highest possible minimum EPT provides the tightest possible window between aggregate maximum EPT 144 and aggregate minimum EPT 142.

In other embodiments, aggregate minimum EPT 142 may be based on the value for aggregate maximum EPT 144. For example, aggregate minimum EPT 142 may be 10% below any value for aggregate maximum EPT 144. If aggregate maximum EPT 144 is 95%, then aggregate minimum EPT 142 is 85%. Thus, the calculation of aggregate minimum EPT 142 does not need to occur with values from each printing device within a group. It also should be noted that these disclosed processes may be performed for each colorant being used by the respective printing devices.

The disclosed embodiments establish a group aim 146. Fleet color management service 102 also creates a tone reproduction curve, or TRC, 148 for each printing device using the values for aggregate maximum EPT 144 and group aim 146. System 100 may use a single TRC 148 for each printing device or it may use individualized TRCs 148. Fleet color management service 102 may install TRC 148 in printing devices 30, 31, and 104 in group C. This process may be repeated for groups A and B such that each group uses its own TRC 148 based on its uploaded measurement, or calibration, data.

FIG. 1C depicts a block diagram of the data flow for a printing device group calibration check using fleet color management service 102 according to the disclosed embodiments. Calibrations within system 100 should be validated in a recurring basis. Fleet color management service 102 tests the color printing capabilities of the printing devices by group using the data processed from the measurement data. Validation may occur using a calibration check 152 for each group. Referring to FIG. 1C, group C is shown. Printing device 104 is shown in detail but the features disclosed with regard to this printing device also may apply to printing devices 30 and 31.

Fleet color management service 102 may generate calibration check 152 that is sent to group C. Other calibration checks may be sent to other groups. Calibration check 152 instructs printing device 104 to print calibration check target 154. Calibration check target 154 is used to determine whether the maximum EPTs for the specific printing device are achievable. Color measurement tool 140C for printing device 104 measures the color data on calibration check target 154 to capture calibration data 156C. After the measurement process is completed, printing device 104 uploads calibration data 156C to fleet color management service 102. Calibration data 156C may include identification 104A to indicated that the received data is from printing device 104 so that service 102 may associate the data with the proper entry in database 132.

The disclosed embodiments may check group calibration in a variety of ways. For example, each printing device may print its calibration check target 154 to generate its own calibration data that is provided to fleet color management service 102. Printing device 30, therefore, provides calibration data 156A with identification 30A while printing device 31 provides calibration data 156B with identification 30B to fleet color management service 102.

Alternatively, the disclosed embodiments may validate calibration for a random subset of printing devices in the group. Every calibration check 152 would use a different random subset. For example, a first calibration check 152 may validate calibration using calibration data from printing devices 104 and 31. A second calibration check 152 may validate calibration using calibration data from printing devices 30 and 31. The disclosed embodiments also may validate calibration by using a single printing device within group C but rotating the selecting printing device every time that a calibration check 152 occurs. Alternatively, the disclosed embodiments may validate using a small number of printing devices but rotate through all of the devices before performing calibration on the same devices twice.

Fleet color management service 102 may ascertain whether each printing device can reproduce the aggregate maximum EPT 144 for the group because database 132 stores the EPTs for each of the printing devices. The uploaded calibration data serve to determine whether each of the printing devices in the group are printing according to its capability. Alternatively, if using a subset of the printing devices within the group, then this data is used to determine the status of the group. For example, if printing device 104 cannot reproduce aggregate minimum EPT 142 and aggregate maximum EPT 144 for group C, then the printing device may be temporarily removed from the group. Alternatively, fleet color management service 102 or the operator may determine to establish a new group TRC 148 using the EPTs that the printing device can achieve.

In some embodiments, the features disclosed by FIGS. 1A, 1B, and 1C may be used managing ICC profiles in a group. The creation of an ICC profile for a group may operate in the same way as disclosed above with regard to calibration. Some differences, however, do exist between calibration and ICC profile creation. Fleet color management service 102 sends an ICC profile creation target to each printing device within group C instead of calibration target 134. System 100 may establish a gamut, or complete range of colors, for each of the printing devices in group C. The disclosed embodiments then establish a group gamut that represents the gamut that all the printing devices can reproduce. Fleet color management service 102 may create and install the ICC profiles for each printing device, as opposed to TRCs 148, within the group.

The disclosed embodiments also may perform group ICC profile validation of the printing devices. The validation process may operate much the same way as with the embodiments disclosed in FIG. 1C, or group calibration validation. One difference may be that the validation checks the gamut that each printing device can reproduce as opposed to EPTs. An ICC profile validation may be more intensive and time consuming than a calibration validation check.

Figure 2:
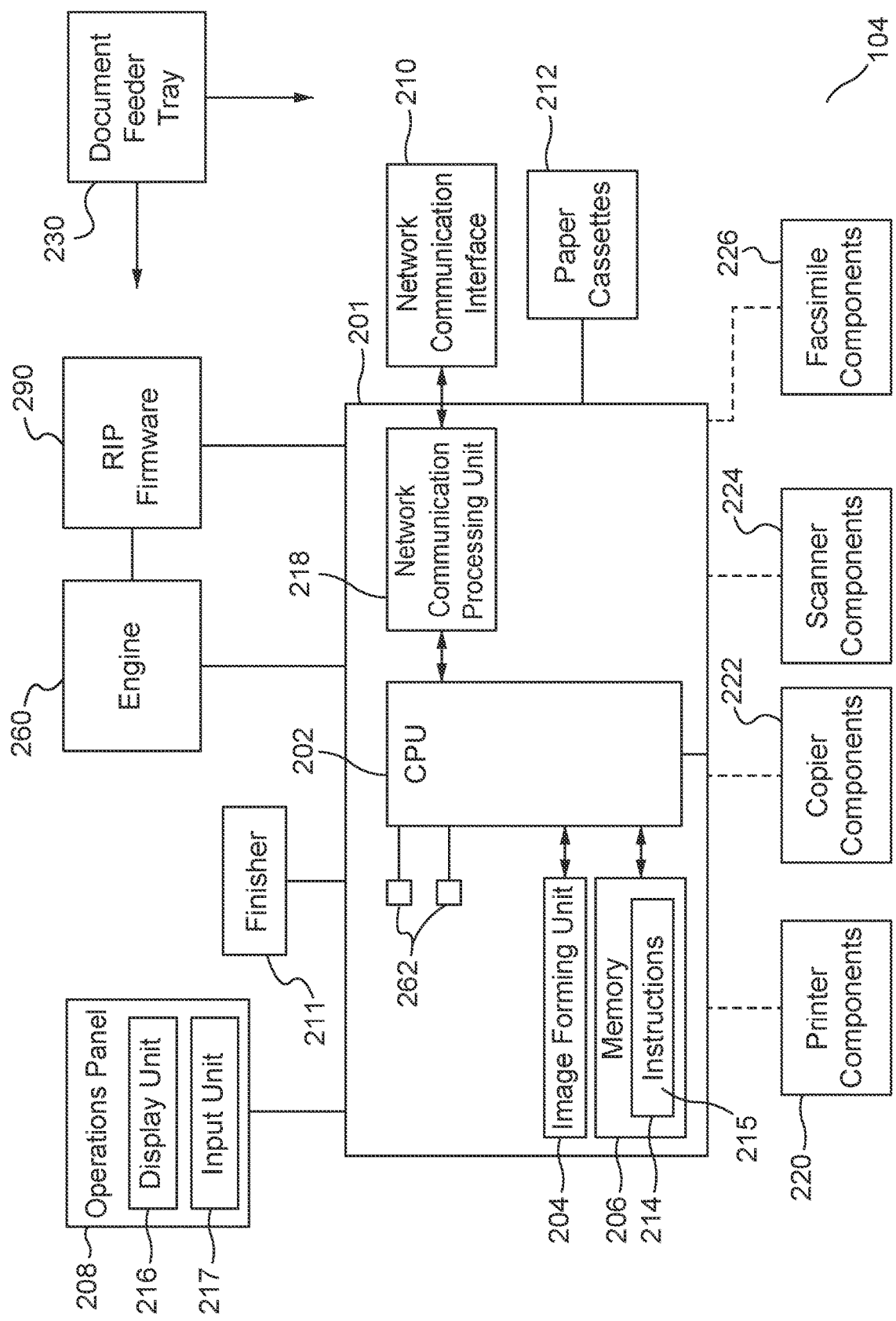
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from fleet color management service 102 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EE-PROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or network service 106. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with network service 106 via network communication interface 210 by utilizing a network protocol, such as the ones listed above. In some embodiments, printing device 104 communicates with network service 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from fleet color management service 102.

Figure 3:
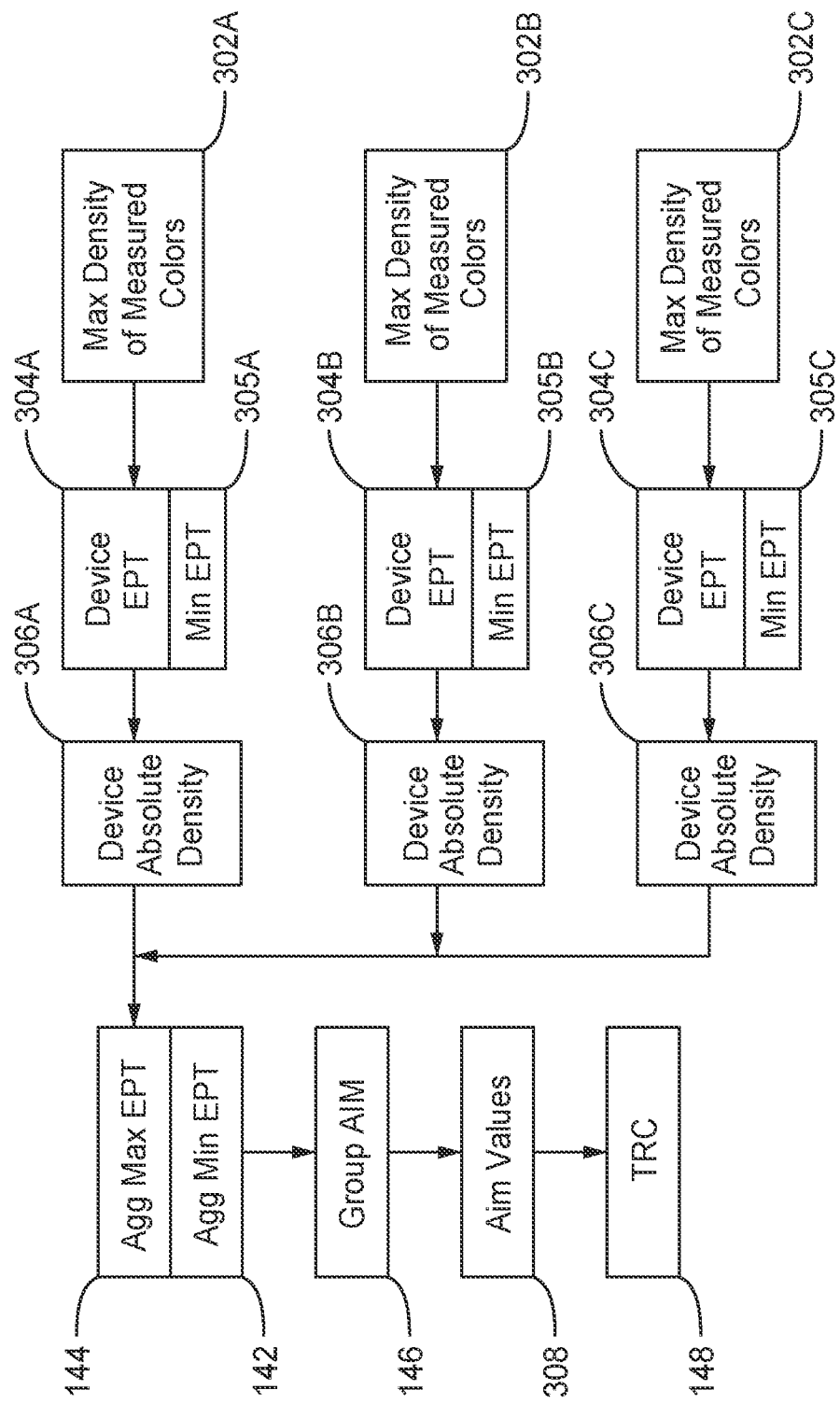
FIG. 3 illustrates a flow diagram of data to generate an aggregate maximum EPT and an aggregate minimum EPT according to the disclosed embodiments.

FIG. 3 depicts a flow diagram of data to generate aggregate maximum EPT 144 and aggregate minimum EPT 142 according to the disclosed embodiments. FIG. 3 shows the flow of the data captured at each printing device within a group to determine the group parameters that are used to generate TRC 148. Using the printing devices in group C, data is collected that is processed by fleet color management service 102 to determine aggregate minimum EPT 142, aggregate maximum EPT 144, and group aim 146. The group aims for each color may be compiled as aim values 308 that are used to generate TRC 148.

In short, fleet color management service 102 collects measured density values from calibration target 134 at each printing device that is used to generate TRC 148 for the group. When one measures a color for a printing device, the measured data reflects the maximum density that the printing device can reproduce for any given color. A printing device may not be able to reproduce the maximum density for that color in a reliable manner so system 100 may set an EPT that is a percentage of the measured maximum. Although the value is expressed as a percentage, the disclosed embodiments may track this value as an absolute density. Typically, a conventional printing system may set EPTs at 95%.

The disclosed embodiments, however, adjusts printing devices within a group so that the EPT with the lowest absolute density becomes the EPT for all the printing devices within the group. All printing devices within the group are measured using calibration track request 112. For example, an EPT of 95% for the lowest density printing device may correspond to EPTs of 92%, 87%, 91%, and so on for the other printing devices within the group. Although different, these values will all represent the same absolute density reproducible by all printing devices within the group. In other words, the lower the EPT value, the higher the absolute density that a given printing device can achieve.

The minimum EPT for the group may set the floor below which system 100 or fleet color management service 102 should recommend an action to the operator. The printing device should be serviced to meet the minimum EPT for the group. For example, if the maximum EPT for the group is set to 95%, then the minimum EPT may be set to 90%. System 100 or fleet color management service 102 may take action because the printing device listed above having the 87% EPT. In some embodiments, system 100 may correct this problem by identifying the printing device within the group with the deficient EPT and performing a corrective procedure accordingly.

For example, if the maximum EPT cannot be achieved then a warning may be set but the printing device allowed to continue to operate as long as it can meet the minimum EPT. If the minimum EPT cannot be achieved, then that printing device should stop printing and it should be temporarily removed from the group. If the achieved density is below the maximum but above the minimum, then it is acceptable to continue production. However, a warning status will be defined so that the operator knows that he/she needs to do something to recalibrate or do something to bring the printing device back to optimal color reproduction to achieve the maximum EPT. The main benefit of this feature is that color reproduction is not a pass/fail condition. The disclosed embodiments include a buffer between the maximum EPT and the minimum EPT, which provides early warning that something needs to be done to the printing before things degrade to an unacceptable level.

Referring to FIG. 3, the maximum densities for printing devices 30, 31, and 104 of group C are measured. In some embodiments, each color may be measured and a maximum density determined for that color determined. Alternatively, the maximum densities may be used compiled to determine a maximum density value for the printing device. Thus, maximum density 302A of measured colors may be determined for printing device 30, maximum density 302B of measured colors may be determined for printing device 31, and maximum density 302C of measured colors may be determined for printing device 104.

Using these maximum density values, each printing device then determines or sets the EPT for that device. Thus, printing device 30 includes device EPT 304A, printing device 31 includes device EPT 304B, and printing device 104 includes device EPT 304C. Fleet color management service 102 may determine absolute density values based on the EPTs of each device. Printing device 30 includes absolute density 306A. Printing device 31 includes absolute density 306B. Printing device 104 includes absolute density 306C. These values may be stored in database 132 and associated with the corresponding printing device in group C.

Fleet color management service 102 determines the group parameters from the received data from the printing devices. Service 102 may determine aggregate maximum EPT 144 from device EPTs 304A-C or absolute densities 306A-C using the features disclosed above. In some embodiments, aggregate maximum EPT 144 is the smallest maximum EPT value from the printing devices in the group. For example, if printing device 30 has a device EPT 304A of 95% corresponding to absolute density 306A, printing device 31 has a device EPT 304B of 92% corresponding to absolute density 306B, and printing device 104 has a device EPT 304C of 88% corresponding to absolute density 306C, then aggregate maximum EPT 144 should be 88% for group C, which corresponds to absolute density 306C. In the disclosed embodiments, absolute densities are used to compare devices.

With regards to aggregate minimum EPT 142, this value may be determined in different manners. In some embodiments, device minimum EPTs 305A-C may be determined based on device EPTs 304A-C. As noted above, a minimum EPT for a color may be a certain percentage below the device EPT. For example, if device EPT 304C is 88%, then minimum EPT 305C may be 78% or 10% lower than the value for the device EPT. The disclosed embodiments convert these values to absolute densities to do the comparisons between multiple printing devices. These values may be provided to fleet color management service 102 to determine aggregate minimum EPT 142. In some embodiments, fleet color management service 102 may determine the largest minimum EPT from the printing devices to select aggregate minimum EPT 142. Using the values provided above, minimum EPT 305A of printing device 30 is 85%, minimum EPT 305B of printing device 31 is 82%, and minimum EPT 305C of printing device 104 is 78%. Thus, aggregate minimum EPT 142 for group C is 85%.

In other embodiments, aggregate minimum EPT 142 may be determined solely from the value for aggregate maximum value 144. The printing devices within the group do not calculate or submit values for minimum EPTs. Thus, under these embodiments, aggregate maximum EPT 144 is 78% for group C. This aggregate EPT corresponds to a density value which will appear as a different percentage in each printing device, similar to the maximum EPT. It may be apparent that the different embodiments to determine aggregate minimum EPT may result in different values. Thus, in some embodiments, an aggregate minimum EPT 142 is not calculated.

The disclosed embodiments may perform the processes to determine aggregate maximum EPTs 144 for all colors being managed within system 100. Thus, different aggregate maximum EPT values may be determined based on different EPTs provided by the printing devices within the group. For example, fleet color management service 102 may determine maximum and minimum EPT values for the colors of cyan, magenta, yellow, and black for printing devices in a group. The distinct EPT values may be used to determine a group aim 146 for that color.

According to some embodiments, the aim is an adjustment to the 50% mark for a color, which then tapers as one moves away from that 50% mark. The maximum EPT may provide the ceiling relative to which the 50% mark is found. This may be an adjustment to density that is used to compensate for dot gain. This adjustment may be different for different printing devices. The group aims may be compiled to generate aim values 308 for the group.

Referring to FIG. 4, table 400 depicts group aim values 308 as well as aggregate maximum EPTs 144 and aggregate minimum EPTs 142 for the colors being managed according to the disclosed embodiments. Aim values also may be known as aim points. The aim points are color densities to be achieved to meet printing standards for the group, based on the EPT values. Thus, table 400 includes columns for colors 402, minimum density 404, maximum density 406, and tone value increase 408. Aim values 308, minimum density 404, and maximum density 406 may represent the density at a solid color, as listed under colors 402.

Using the example given above, colors 402 include cyan, magenta, yellow, and black. Aggregate maximum EPTs 144 and aggregate minimum EPTs 142 may be determined for each color and used to determine maximum density value 406 and minimum density value 404, respectively. For example, cyan for the printing devices in group C may have a maximum density value of 1.45 and a minimum density value of 1.35. These values may be stored of Ae between the paper color and the patch color. The group aim value for cyan may be 1.40. Magenta may have a maximum density value of 1.45 and a minimum density value of 1.38. The group aim value for magenta may be 1.40 as well. Yellow may have a maximum density value of 0.98 and a minimum density value of 0.90. The group aim value for yellow may be 0.90. Black may have a maximum density value of 1.65 and a minimum density value of 1.55. The group aim value for black may be 1.60.

Group aim values 308 are used to generate TRC 148. The aim value should be an adjusted density for the 50% mark of the Ae, which ranges from 0 to the max density. TRC 148, therefore, will have group aims of 1.40 for cyan, 1.40 for magenta, 0.90 for yellow, and 1.60 for black. As can be seen, the aim values are between the maximum and minimum density values. The disclosed embodiments may use various processes to select the group aim value for a color. Referring back to FIG. 3, TRC 148 is generated for the group.

Figure 5:
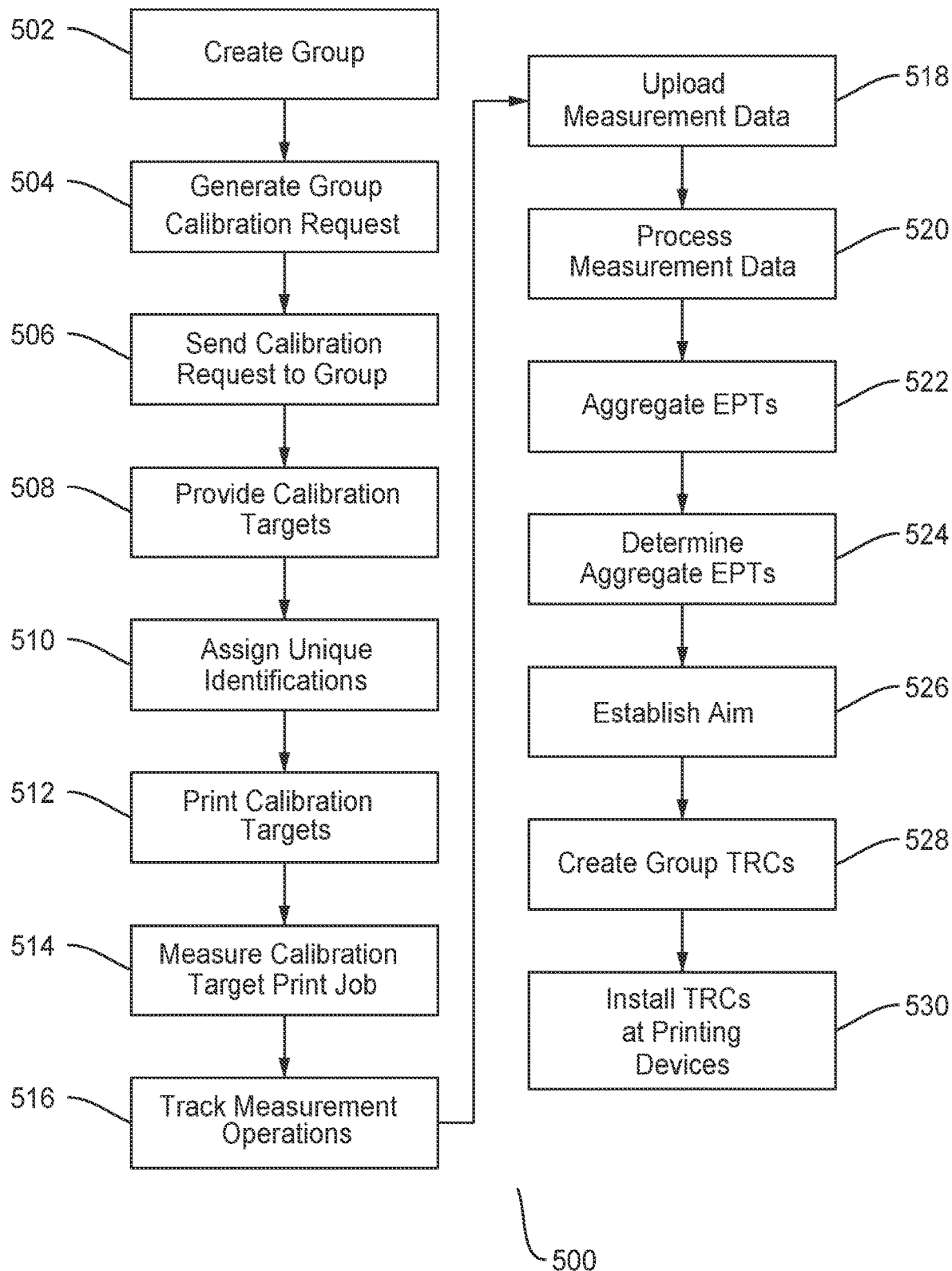
FIG. 5 illustrates a flowchart for calibrating a group of printing devices to create a TRC according to the disclosed embodiments.

FIG. 5 depicts a flowchart 500 for calibrating a group C of printing devices to create a TRC 148 according to the disclosed embodiments. Flowchart 500 may refer to FIGS. 1-4 for illustrative purposes. The embodiments disclosed by flowchart 500, however, are not limited by the features of FIGS. 1-4.

Step 502 executes by creating a group of printing devices. Referring to FIG. 1A, at least two or more printing devices are in a group. Each group may be treated separately from the other groups. For example, the printing devices in group A receive instructions that may not be received by the printing devices in group C. As shown, group C includes printing devices 30, 31, and 104, as used in describing the disclosed embodiments below.

Step 504 executes by generating group calibration request 112 to group C. Group calibration request 112 may be generated at fleet color management service 102. Step 506 executes by sending calibration request 112 to a group within system 100, such as group C. Calibration request 112 includes calibration targets 134, one for each printing device within the group.

Step 508 executes by providing calibration targets 134 of calibration request 112 to the printing devices within the group. Step 510 executes by assigning unique identifications to each calibration target 134. As disclosed above, each target may be associate with a unique identification corresponding to a printing device within the group. The disclosed embodiments may track the performance and completion of the calibration operations using the unique identifications. For example, unique identification 104A may be associated with printing device 104 and placed with its calibration target 134.

Step 512 executes by printing calibration targets 134 as print jobs 136. Each printing device will process its calibration target as a print job that is printed out on the specified media. System 100 may track all the print jobs to make sure they have been printed out. If not, then system 100 may issue a warning or notification to the operator. Step 514 executes by measuring each calibration target print job at the associated printing device. The operator may print the print jobs and measure the information thereon in any order. For example, at printing device 104, color measurement tool 138C is used to measure the density and other information provided by the color patches within print job 136 to generate measurement data 140C. This process is repeated for printing devices 30 and 31 to generate measurement data 140A and 140B.

Step 516 executes by tracking measurement operations at the printing devices to ensure completion. The unique identification provided with the calibration target for each printing device is attached to the generated measurement data to track the results of the calibration operation within system 100. Step 518 executes by uploading measurement data to fleet color management service 102. Service 102 tracks and stores the uploaded data with its unique identification. For example, when measurement data 140C are received by fleet color management service 102, it notes the completion of the calibration operations using unique identification 104A.

Step 520 executes by processing the measurement data received from the printing devices within the group. Once all the measurement data for the calibration operations are uploaded, fleet color management service 102 performs operations to obtain maximum EPTs for each color from the measurement data. Referring to FIG. 3, device EPTs 304A, 304B, and 304C may be determined. Step 522 executes by aggregating all the device EPTs. Thus, for each color or condition, the device, or maximum EPTs, may be aggregated such that a plurality of EPT values are available.

Step 524 executes by determining aggregate maximum EPT 144 for the group. This process is disclosed above. In some embodiments, the smallest maximum EPT value within the group is used to set the aggregate maximum EPT for the group. This process may be repeated for each color. Minimum aggregate EPT 142 for the group also may be determined according to the processes disclosed above. In some embodiments, the largest minimum EPT value may be used to determine minimum aggregate EPT 142. Step 526 executes by establishing group aim 146 based on maximum aggregate EPTs 144. Group aim 146 may comprise the maximum EPTs for each color.

Step 528 executes by creating group TRC 148 using the EPTs and group aim 146. System 100 may use a single TRC for all printing devices within the group or it may use individualized TRCs that output the same aim. Step 530 executes by installing TRC 148 on each printing device within the group. For example, printing devices 30, 31, and 104 will install TRC 148.

Figure 6:
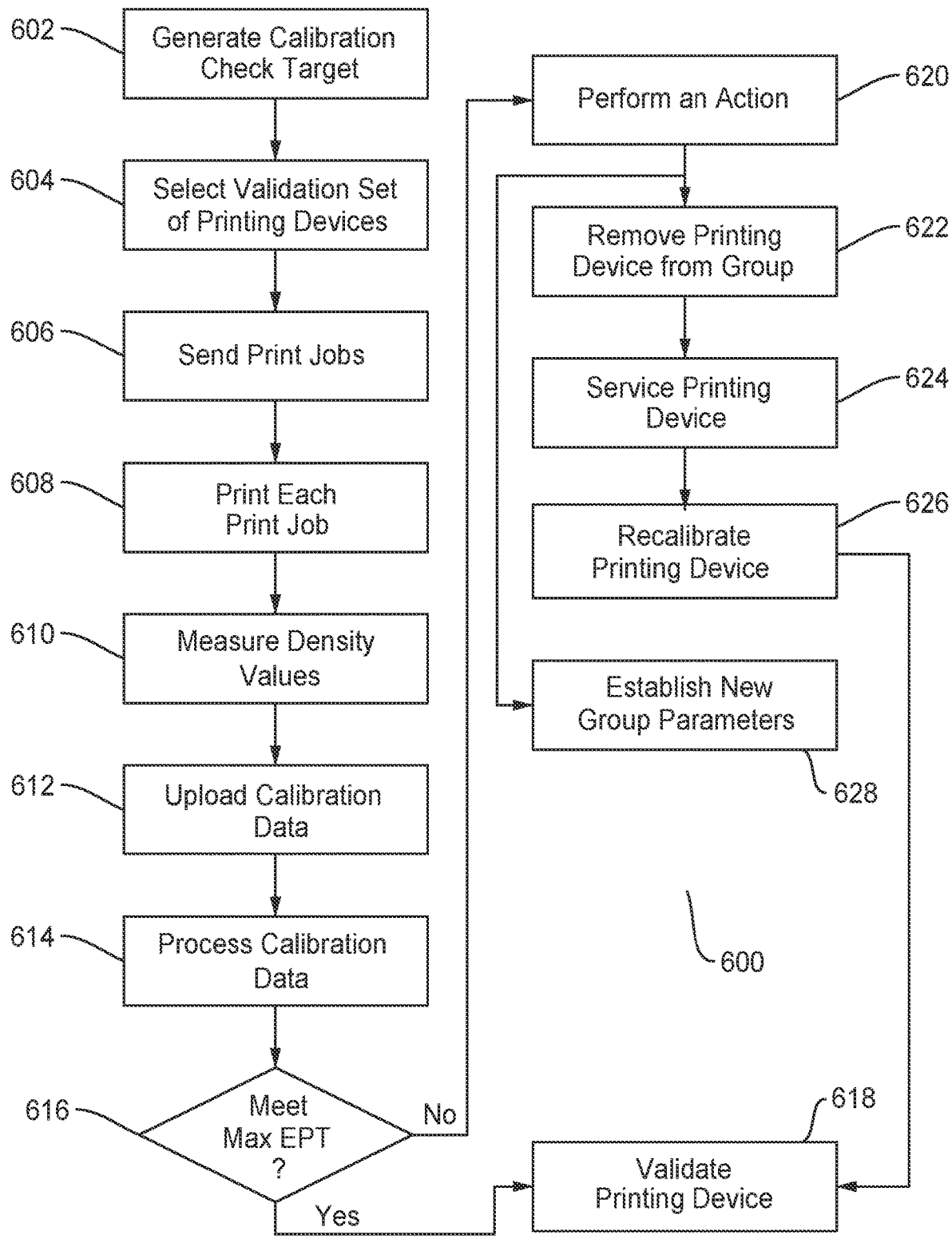
FIG. 6 illustrates a flowchart for performing a group calibration check within a group of printing devices according to the disclosed embodiments.

FIG. 6 depicts a flowchart 600 for performing a group calibration check 152 within group C according to the disclosed embodiments. Flowchart 600 may refer to FIGS. 1-5 for illustrative purposes. The embodiments disclosed by flowchart 600, however, are not limited by the features of FIGS. 1-5.

Step 602 executes by generating calibration check targets 154 for calibration check 152. Referring to group C, each printing device within the group will receive a calibration check target. The calibration check target is used to determine whether aggregate maximum EPT 144 is being met for each color at the respective printing device. It also may be used to determine whether the printing devices within a group meet aggregate minimum EPT 142 for each color. This process may validate TRC 148 at each printing device.

Step 604 executes by selecting a validation set of printing devices within a group to perform calibration check 152. The validation set may be selecting in a number of ways. Preferably, the validation set is a subset of the total number of printing devices within a group. Referring to group C, the disclosed embodiments may select printing devices 31 and 104 to perform calibration check 152. Printing device 30 is not included in the check process. This features allows for the group to use at least one printing device while the check is occurring. Not every printing device needs to be tied up doing the calibration check.

The following processes may be used to select the validation set. The disclosed embodiments may validate calibration for all printing devices within the group. Thus, printing devices 30, 31, and 104 validate calibration according to the disclosed embodiments. The disclosed embodiments also may validate calibration for a random subset of printing devices within the group. For example, printing devices 30 and 31 are selected to perform calibration check 152. Every calibration check 152 would use a different random subset. Validation also may occur using a single printing device, such as printing device 104. The selected printing device may be rotated for each calibration check 152. This rotation process also may occur for a subset of printing devices within the group.

Step 606 executes by sending print jobs as calibration targets 154 to each printing device within the validation set. For example, if the validation set is printing device 104, then it received calibration target 154. Step 608 executes by printing the print job, or calibration target 154, at the designated printing device or devices within the validation set. The print job includes a series of color patches to perform the calibration check. The color patches may be arranged in one or more rows. Different colors may be used to test each aggregate maximum EPT 144 for TRC 148.

Step 610 executes by measuring the density values of the color patches of the print job at each printing device receiving a calibration target. Other values also may be measured, such as hues and luminosities. The measurement process may use the associated color measurement tool for the printing device. Referring to FIG. 1C, printing device 104 measures the items on calibration target 154 using color measurement tool 140C. This action generates calibration data 156C for printing device 104. The other printing devices within group C also may generate calibration data, such as calibration data 156A from printing device 30 and calibration data 156B from printing device 31.

Step 612 executes by uploading the calibration data measured at the printing devices within the validation set to fleet color management service 102. Before being sent to service 102, the printing device may attach its unique identification to identify that the received data is from the appropriate printing device. Thus, calibration data 156C include unique identification 104A from printing device 104. Fleet color management service 102 can track the calibration target jobs this way to make sure each printing device of the validation set measures and uploads its calibration data.

Step 614 executes by processing the received calibration data. Because fleet color management service 102 stores the aggregate EPTs for each of the printing devices, or for the group, it can ascertain whether each printing device of the validation set can reproduce the aggregate EPTs for that group. Thus, the disclosed embodiments determine the EPTs for each color from the calibration data. These EPTs are then compared to the applicable aggregate maximum EPT 144 and aggregate minimum EPT 142 to validate the printing device. Thus, step 616 executes by determining whether a printing device within the validation set meets aggregate maximum EPTs 144 for the colors being managed within system 100.

If step 616 is yes, then flowchart 600 proceeds to step 618, which executes by validating the printing device. Flowchart 600 then may return to step 616 to validate another printing device, if necessary.

If step 616 is no, then step 620 executes by performing an action based on the printing device not meeting the requirements for the group. A notification may be sent to the operator that the printing device is not able to reproduce the maximum or minimum EPTs specified for the group. Another action may be executed by step 622 which includes removing the printing device from the group. The removal may be temporary. For example, if printing device 104 does not meet the parameters for group C, then it is removed from printing operations. Print jobs will be sent to printing devices 30 and 31.

Step 624 executes by servicing the printing device that is not validated. Again, a notification may be sent to the operator to service printing device 104 to meet the parameters, or aggregate EPTs for group C. After servicing the printing device, the operator may inform fleet color management service 102 that another calibration check 152 may be performed. Thus, step 626 executes by recalibrating the printing device to ensure it can be validated. System 100 may check whether the maximum EPTs can be achieved. If they can be met, then the printing device is validated and can rejoin the group. If so, then flowchart 600 proceeds to step 618 to validate the printing device so it can rejoin the group. If the maximum EPTs cannot be achieved then additional actions may be necessary.

Another possible action may be executed by step 628, which establishes a new group TRC using the parameters that the printing device can achieve. New aggregate maximum EPTs 144 and aggregate minimum EPTs 142 may be determined that allows the printing device to remain in the group. These values then may be used to determine a new group aim 146 and TRC 148. Another option may be is to adjust the current groups EPTs.

FIG. 7 depicts a system 100 configured for creating and validating a group ICC profile 910 according to the disclosed embodiments. The disclosed embodiments may create and validate ICC profiles much in the same way that the disclosed embodiments validate using aggregate maximum EPTs 144 and group aim 146. Group ICC profile 146 operates the same way as TRC 148, with some differences. Thus, system 100 in FIG. 7 may include different features from FIGS. 1-6. Similar features may be described but not shown for brevity.

Fleet color management service 102 may generate a profile request 902. Profile request 902 may include profile targets to be printed as print jobs at each printing device. The profile targets also may be known as ICC profile creation targets, which are different from the calibration targets disclosed above. The profile targets want to test the complete range colors available at the printing devices within the group.

Thus, printing device 30 prints profile target 904A, printing device 31 prints profile target 904B, and printing device 104 prints profile target 904C. Using the applicable color measurement tool, each printing device measures the profile target, which includes a substantially more data points than a calibration target. The measurement process generates measurement data for each profile target. Printing device 30 generates measurement data 906A. Printing device 31 generates measurement data 906B. Printing device 104 generates measurement data 906C. The applicable unique identification may be attached to each set of measurement data to allow service 102 to track the profile creation process.

Measurement data 906A, 906B, and 906C are uploaded to fleet color management service 102 for processing. Service 102 determines the gamut for each of the printing devices within the group. In turn, service 102 then establishes a group gamut 908 that represents the gamut that all printing devices can reproduce. The gamut may correspond to the parameters determined for calibration operations disclosed above, except it involved the complete range that the printing devices can reproduce in the group.

System 100 uses group gamut 908 to create ICC profile 910 that is installed in each of the printing devices within the group. The printing devices may use the same ICC profile or each printing device may use individualized ICC profiles that reproduce the same gamut. System 100 also may perform validation operations similar to the calibration checks disclosed above. One difference may be that the validation checks the gamut that a printing device can reproduce.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing color calibration in a plurality of printing devices, the method comprising;
   generating a plurality of calibration target print jobs in response to a calibration request for the plurality of printing devices;
   printing the plurality of calibration target print jobs at the plurality of printing devices, wherein each of the plurality of calibration print jobs is assigned a unique identifier and sent to a specific printing device of the plurality of printing devices associated with the unique identifier;
   measuring each of the plurality of calibration target print jobs;
   uploading measurement data for each of the plurality of calibration target print jobs using the respective unique identifier to a platform;
   aggregating the measurement data from the plurality of calibration target print jobs;
   determining an aggregate maximum end point target applicable to the plurality of printing devices based on the measurement data, wherein each of the plurality of printing devices can achieve the aggregate maximum end point target;
   establishing an aim for the plurality of printing devices using the aggregate maximum end point target; and
   creating a tone reproduction curve for at least one printing device according to the aim plus the aggregate maximum end point target.

2. The method of claim 1, further comprising determining a maximum end point target for each of the plurality of printing devices according to the measurement data.

3. The method of claim 2, further comprising identifying a smallest value of the maximum end point targets of the plurality of printing devices as the aggregate maximum end point target applicable to the plurality of printing devices.

4. The method of claim 1, further comprising determining an aggregate minimum end point target based on the aggregate maximum end point target.

5. The method of claim 4, further comprising identifying a printing device below the aggregate minimum end point target according to its measurement data.

6. The method of claim 1, wherein measuring each of the calibration target print jobs includes using a color measurement tool to capture the measurement data.

7. The method of claim 1, wherein creating the tone reproduction curve includes creating an individualized tone reproduction curve for each of the plurality of printing devices.

8. A method for performing a calibration check for a plurality of printing devices, the method comprising:
   generating a calibration check target based on a tone reproduction curve applicable to the plurality of printing devices, wherein the calibration check target corresponds to a maximum end point target for each of the plurality of printing devices;

selecting a validation set of printing devices from the plurality of printing devices;

sending a print job for the calibration check target to each of the validation set of printing devices;

printing the print job for calibration check target at each of the validation set of printing devices;

measuring density values of the print job at each of the printing devices in the validation set;

determining whether the density values meet the maximum end point target for each of the printing devices in the validation set; and validating each of the printing devices in the validation set according to the determination whether the respective density values meet the maximum end point target.

9. The method of claim 8, wherein selecting the validation set of printing devices includes selecting a random subset of printing devices of the plurality of printing devices.

10. The method of claim 8, wherein selecting the validation set of printing devices includes selecting a single printing device from the plurality of printing devices.

11. The method of claim 8, wherein an action is taken for one or more printing devices of the printing devices in the validation set.

12. The method of claim 11, wherein the action taken for the one or more printing devices includes removing the one or more printing devices from the plurality of printing devices.

13. The method of claim 11, wherein the action taken for the one or more printing devices includes establishing a new tone reproduction curve based on a modified maximum end point target.

14. The method of claim 8, wherein measuring the density values of the print job include using a color measurement tool.

15. The method of claim 8, wherein the calibration check target is represented by at least one color patch within the print job.

16. A method for managing color printing for a plurality of printing devices, the method comprising:

generating a plurality of calibration target print jobs in response to a calibration request for the plurality of printing devices;

printing the plurality of calibration target print jobs at the plurality of printing device, wherein each of the plurality of calibration target print jobs is assigned a unique identifier and sent to a specific printing device of the plurality of printing devices associated with the unique identifier;

measuring each of the plurality of calibration target print jobs;

uploading measurement data for each of the plurality of calibration target print jobs using the respective unique identifier to a platform;

aggregating the measurement data from the plurality of calibration target print jobs;

determining an aggregate maximum end point target applicable to the plurality of printing devices based on the measurement data, wherein each of the plurality of printing devices can achieve the aggregate maximum end point target;

establishing an aim for the plurality of printing devices using the aggregate maximum end point target;

creating a tone reproduction curve for at least one printing device according to the aim plus the aggregate maximum end point target;

generating a calibration check target based on the tone reproduction curve applicable to the plurality of printing devices, wherein the calibration check target corresponds to the aggregate maximum end point target for each of the plurality of printing devices;

selecting a validation set of printing devices from the plurality of printing devices;

sending a print job for the calibration check target to each of the printing devices in the validation set;

printing the print job for the calibration check target at each of the printing devices in the validation set;

measuring density values of the print job at each of the printing devices in the validation set;

determining whether the density values for each of the printing devices in the validation set meet the aggregate maximum end point target; and validating each of the printing devices in the validation set according to the determination whether the respective density values meet the aggregate maximum end point target.

17. The method of claim 16, further comprising determining a maximum end point target for each of the plurality of printing devices according to the measurement data.

18. The method of claim 17, further comprising identifying a smallest value of the maximum end point targets of the plurality of printing devices as the aggregate maximum end point target applicable to the plurality of printing devices.

19. The method of claim 16, determining an aggregate minimum end point target based on the aggregate maximum end point target.

20. The method of claim 16, wherein the calibration check target is represented by at least one color patch within the print job.

* * * * *